May 18, 1965     R. CALABRESE     3,184,265
DUAL PURPOSE ANTI-GLARE SHIELDS
Filed Nov. 28, 1962
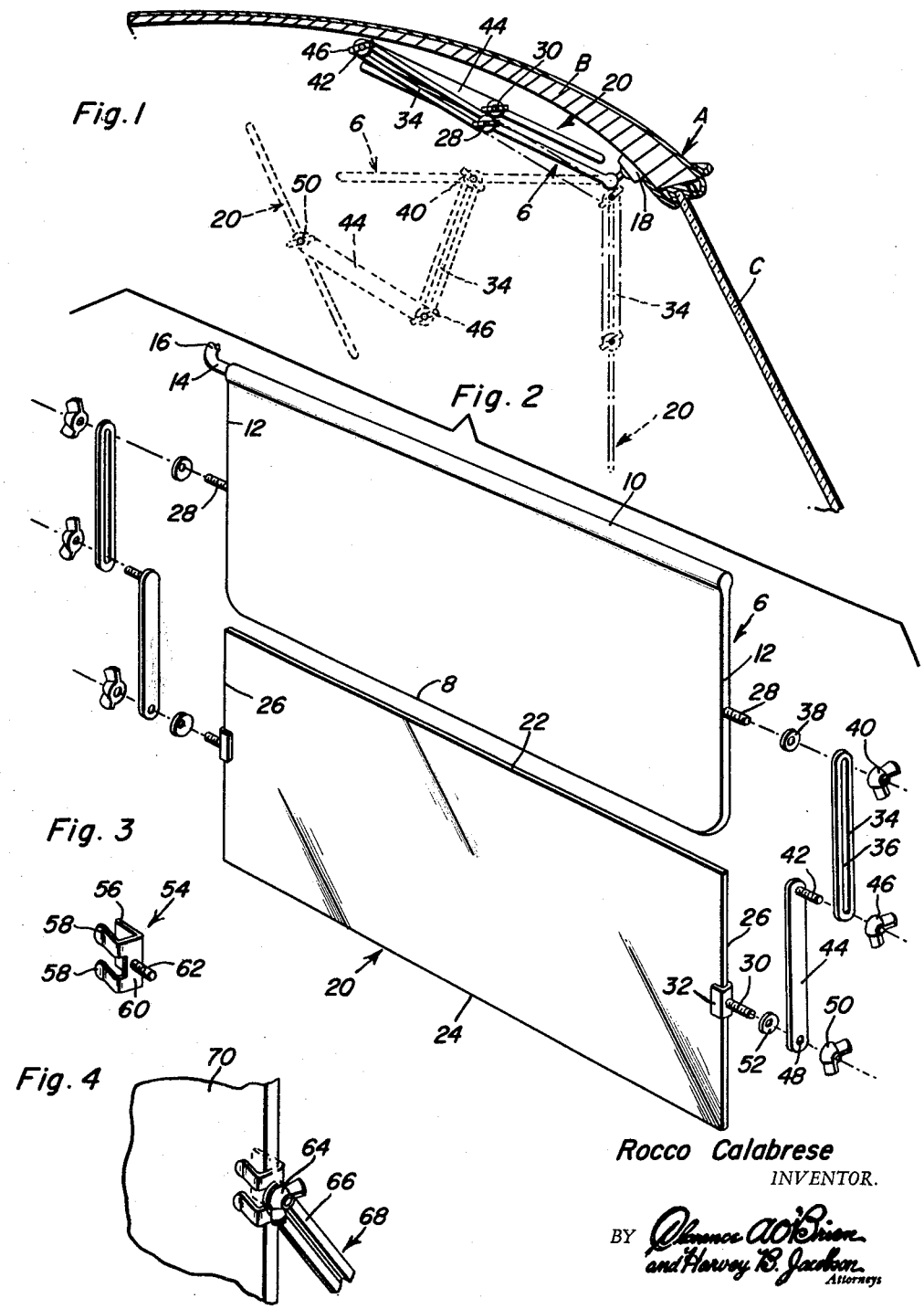
Rocco Calabrese
INVENTOR.

United States Patent Office 3,184,265
Patented May 18, 1965

3,184,265
DUAL PURPOSE ANTI-GLARE SHIELDS
Rocco Calabrese, 34 W. Somerset St., Raritan, N.J.
Filed Nov. 28, 1962, Ser. No. 240,646
2 Claims. (Cl. 296—97)

The present invention relates to adjustably mounted shields which are commonly referred to in the prior art as sun visors, anti-glare shields, light intercepting panels and the like, and has reference, more particularly, to an improved construction and an arrangement characterized by a pair of companion panels having transverse end portions operatively joined by novel assembling and connecting means.

It is old in the art to provide a pair of complemental panel-type shields wherein one shield is adjustably and hingedly bracketed to a part of the vehicle above and adjacent to the upper part of the windshield so that it may be used in diversified ways.

More specifically, the invention has to do with an adaptable arrangement which utilizes and relies upon the customary or conventional sun visor. This sun visor constitutes one of the panel-type shields and functions in its regularly used manner. The second panel, unlike the non-transparent sun visor, comprises a suitably colored semi-transparent panel-type shield. Persons conversant with the art to which the invention relates are aware that the utilization of two such constructed shields or panels with means for attaching or bracketing the two together is old as exemplified, for example, in a patent to Bartlett, 2,829,919 and a similar adaptation in Stansberry, 2,020,585.

It is an objective in the instant presentation to structurally, functionally and in other practical and feasible ways to improve upon the aforementioned prior patents or analogous prior art dual-type shields and, in doing so, to advance this art and to provide significant improvements which render the improved combination unique and susceptible of attaining an improved result.

Briefly summarized, the present invention is characterized by a first flat-faced elongated panel which is non-transparent and which constitutes a sun visor, means cooperable with and designed and adapted to adjustably mount said visor so that it may be located for use in whatever position needed relative to an associated stationary windshield, a second flat-faced elongated panel similar to the first panel but semi-transparent, and linkage operatively connecting the respective transverse ends of said panels, whereby said panels may be simultaneously or independently moved and angularly adjusted relative to each other.

In carrying out a preferred embodiment of the invention, novel linkage is provided for assembling and operatively joining or linking the respective transverse ends of the two panels or shields together to achieve many and varied relative positions of the panels to each other and in relation to the windshield and the person using the same.

To the ends desired, the linkage at the respective panel ends is characterized in each instance by a pair of similar links, said links having their inner ends separably and adjustably bolted together and having their outer ends pivotally and separably joined to the corresponding transverse ends of the respective shields or panels.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a view showing a fragmentary portion of the roof and windshield of an automobile or an equivalent vehicle and illustrating, what is more important, the improved combination shields, said shields being illustrated in full lines and also dotted lines, the latter showing customarily used positions of the shields;

FIGURE 2 is an exploded perspective view with all of the component parts drawn on a scale sufficient to clearly illustrate the construction and cooperative association thereof;

FIGURE 3 is a perspective view of an adaptor clamp; and,

FIGURE 4 is a fragmentary perspective view showing the clamp attached to one transverse end of a common sun visor and how it functions to accommodate the cooperating detachable pivoted end of the slotted link.

With reference first to FIGURES 1 and 2 and primarily to FIGURE 1, the reference letter A designates an automobile or other equivalent vehicle having a roof B and a windshield C with which the component parts of the instant invention are cooperatively associated in the manner illustrated in FIGURE 1. Referring now to FIGURE 2, the numeral 6 designates one of the panel-like shields and more specifically, this comprises a rectangular non-transparent sun visor which is substantially conventional and provided with length-wise edges 8 and 10 and transverse ends or edges 12. At the left-hand end of the upper edge 10 the suspending and hinging as well as adjusting shaft 14 is shown. The laterally directed end portion 16 is adjustably joined by ball and socket attaching means 18 to the roof of the car to provide a commonly usable sun visor. This sun visor (in the instant matter) is used in conjunction with and provides a support and adjusting means for a second panel-type anti-glare shield 20. This part comprises a rectangular light intercepting panel which is of a suitable grade of commercial plastics, is transparent to provide the desired light intercepting and glare reducing results. This panel is also provided with lengthwise marginal edges 22 and 24 and transverse ends or edges 26. The panel is approximately commensurate in size with the panel 6. The respective transverse ends 12 and 26 are operatively associated and connected by novel linkage means shown to the left and right, respectively, of the main components in FIGURE 2. Looking toward attainment of best possible results, the transverse ends 12 are provided intermediate the upper and lower edges 8 and 10 with outstanding screw-threaded studs 28. The transverse ends 26 of panel 20 are likewise provided intermediate their edges 22 and 24 with similar outstanding screw-threaded studs 30, which in this instance are shown secured at the inner ends by way of U-shaped or equivalent clips 32. The linkage means at each end cooperable with the respective studs 28 and 30 is the same in construction and a description of one will suffice for both. To this end there is an upper linearly straight link 34 of appropriate length having an elongated slot 36 ranging from one end to the other. The upper end portion of the slot is fitted over the co-acting stud against the washer 38 surrounding the stud and is hingedly and detachably connected to the sun visor or shield 6 by way of the thumb-nut 40. The lower end of the slot is detachably and adjustably connected with a lateral integral screw-threaded stud 42 which is carried by the cooperating inner end of the non-slotted or solid link 44. This is accomplished by way of a second wing nut 46. At the lower end of the link 44 (FIGURE 2) a bolt hole 48 is provided and the stud 30 extends therethrough and the connection is made by a third wing nut 50 attached to the stud 30. A suitable washer 52 is used in the manner illustrated.

In the arrangement depicted in FIGURES 1 and 2 and in FIGURE 2 in particular, the sun visor 6 is non-transparent, as is common. However, it is made to include as an original feature, the axially aligned outstanding screw threaded link accommodating studs 28 at the respective transverse ends. A conventional sun visor is not manufactured, at least at the present time, with extra or auxiliary panel accommodating means such as the studs under consideration. In construing the invention under advisement it is significant to think of it as an adaptation which will be supplied by the manufacturer with the new car, while in other instances the invention has to be thought of as an accessory or an attachment purchasable, for example, as a separate item and in some instances in an automobile accessory store. Therefore, the invention is to be construed as for original installation purposes as well as in the category that the auxiliary or second panel 20 constitutes an attachment for a sun visor.

By adopting and using linkage means, more specifically the paired links 34 and 44, on the respective transverse ends of the main and auxiliary panels or shields 6 and 20, it is possible to simultaneously adjust the same in order to bring the sun visor and also the anti-glare shield 20 into play in relation to the windshield at the same time. It is also permissible to maintain the sun visor in an elevated or out of the way position as shown in FIGURE 1 and to simply utilize the shield 20 independently and to adapt or adjust the linkage to allow the angle to be varied as illustrated generally in phantom lines in FIGURE 1. Also with this construction the panel or shield 20 can be folded atop the sun visor to assume a compact and convenient out-of-the-way position when it is stored as illustrated in full lines in edge elevation in FIGURE 1.

Instead of providing the transverse ends 12 of a sun visor 6 with fixed studs 28 detachable studs can be used. This result is achieved through the use of a simple clip 54 of the type illustrated in FIG. 3. This figure shows a substantially U-shaped clip having a wall 56 with opposed resilient clamping fingers 58 joined to the wall or plate portion by way of the bight or web 60. This web is provided with an outstanding screw-threaded stud 62 to accommodate the wing nut 64 and the end portion 66 of the slotted link 68 in the manner illustrated in the modification in FIGURE 4. In this illustration the numeral 70 designates a sun visor as distinguished from the semi-transparent anti-glare shield 20 and although FIGURE 4 shows merely the sun visor, it will be understood that its purpose is to represent an alternate type of sun visor such as is used in the dual or combination shield assembly in FIGURES 1 and 2.

It is a significant aspect of the instant concept that both shields 6 and 20 can be used at the same time; that is, placed in co-planar relationship and suspended in the desired manner between the windshield and the driver. It is also evident that the illustration in FIGURE 1 is not intended to comprehend a showing of all of the possible relation positions of the two shields 6 and 20.

It is believed that careful consideration of the specification in conjunction with the views of the drawing will enable the reader to obtain a clear and comprehensive understanding of the construction and arrangement of component parts in the manner in which they are combined and associated to achieve the desired improved result. Therefore, a more extended description is regarded as unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a first flat-faced elongated panel, said panel being rigid, non-transparent and constituting a sun visor, means cooperable with and designed and adapted to adjustably mount said first panel on relatively stationary support means for cooperation with a relatively stationary windshield, said panel being provided at median portions of its respective transverse ends with axially aligned screw-threaded assembling and retaining studs, a second flat-faced elongated panel similar to the first panel but semi-transparent and provided at its respective transverse ends with outstanding screw-threaded studs similar to the first-named studs, and linkage for connecting the stud-equipped transverse ends of said panels together in assembled but relatively adjustable relationship, the linkage at each end comprising a first longitudinally slotted link, one end of said link being detachably and adjustably connected with a cooperating screw-threaded stud, and a second link, said second link being detachably and adjustably connected at one of its ends with the cooperating stud on the coacting end of said second panel, said second link being provided with a screw-threaded stud extending through a cooperating end portion of the slot in the first-named link and said stud being provided with an assembling and retaining nut.

2. In combination, a first flat-faced elongated panel constituting a conventionally usable sun visor, said sun visor having means along an upwardly disposed longitudinal edge portion whereby the latter may be adjustably mounted on support means provided therefor for cooperation with a relatively stationary automobile windshield, a pair of cooperable outstanding axially aligned screw-threaded link assembling and retaining studs, said studs being mounted on and carried by resilient spring clips and said clips being detachably mounted on median portions of the transverse ends of said panel, a second flat-faced elongated panel similar to the first panel but semi-transparent and having transverse ends provided with fixedly mounted outstanding screw-threaded studs which are similar to the first-named studs and are axially aligned with each other, the respective studs being lateral to the plane of the transverse edge carrying the same and the studs on said first-named panel being equal in length to the length of the studs on the second panel and the respective studs being in spaced parallelism, and linkage at the respective transverse ends of said panels, said linkage functioning to connect the stud-equipped ends of said panels together in assembled but detachable and relatively adjustable relationship, the linkage at each end comprising a first longitudinally slotted link, one slotted end portion of which is detachably and adjustably connected with an adjacent cooperating screw-threaded stud on said first-named panel, and a second link, said second link being detachably and adjustably connected at one of its ends with the cooperating stud on a coacting end of said second panel, the other end portion of said second link being provided with a screw-threaded stud extending removably and slidingly through a cooperating end portion of the slot in the first-named link and said last-mentioned stud being provided with an assembling and retaining nut.

References Cited by the Examiner
UNITED STATES PATENTS

| | | | |
|---|---|---|---|
| 1,764,856 | 6/30 | Ryder | 248—201 |
| 1,918,802 | 7/33 | Fleischer | 88—86 |
| 1,965,839 | 7/34 | Holt | 296—97 |
| 2,317,708 | 4/43 | Zareko | 88—86 |
| 2,542,409 | 2/51 | Guenther | 296—97 |

FOREIGN PATENTS 576,404   4/46   Great Britain.

A. HARRY LEVY, *Primary Examiner.*